United States Patent [19]

Hudec

[11] Patent Number: 4,802,923
[45] Date of Patent: Feb. 7, 1989

[54] BENEFACTION OF CONCRETE AND AGGREGATE USING CALCIUM PHOSPHATE

[76] Inventor: Peter Hudec, 5755, Dalton Avenue, Windsor, Ontario, Canada, N1H 1M9

[21] Appl. No.: 73,198

[22] Filed: Jul. 14, 1987

[30] Foreign Application Priority Data

Jul. 17, 1986 [CA] Canada ................................ 514050

[51] Int. Cl.$^4$ ............................................. C04B 14/00
[52] U.S. Cl. ..................................... 106/97; 106/14.12
[58] Field of Search ................................ 106/14.12, 97

[56] References Cited

U.S. PATENT DOCUMENTS

| | | | |
|---|---|---|---|
| 1,296,467 | 3/1919 | Blumenberg, Jr. | 106/102 |
| 2,048,932 | 7/1936 | Hartvedt | 134/78.5 |
| 3,087,825 | 4/1963 | Meier-Grolman | 106/89 |
| 3,887,488 | 6/1975 | Scott et al. | 252/389 A |
| 3,973,056 | 8/1976 | Fessler et al. | 427/136 |
| 4,000,076 | 12/1976 | Bodine et al. | 252/8.5 A |
| 4,054,460 | 10/1977 | Buchet et al. | 106/89 |
| 4,072,533 | 2/1978 | Barrall et al. | 106/84 |
| 4,168,983 | 9/1979 | Vittands et al. | 106/14.12 |
| 4,605,572 | 8/1986 | Omata et al. | 427/140 |

FOREIGN PATENT DOCUMENTS 57-121069 7/1982 Japan ................................ 106/14.12

Primary Examiner—William R. Dixon, Jr.
Assistant Examiner—David M. Brunsman
Attorney, Agent, or Firm—Foley & Lardner, Schwartz, Jeffery, Schwaab, Mack, Blumenthal & Evans

[57] ABSTRACT

A phosphate additive, such as apatite or monocalcium phosphate monohydrate, is used to treat concrete aggregate and concrete to improve its resistance to natural and salt induced breakdown. The phosphate can also be used in association with road salt to prevent spalling and breakdown of concrete surfaces and damages to cars. Used alone as a surface treatment, it has the same effect.

12 Claims, 1 Drawing Sheet

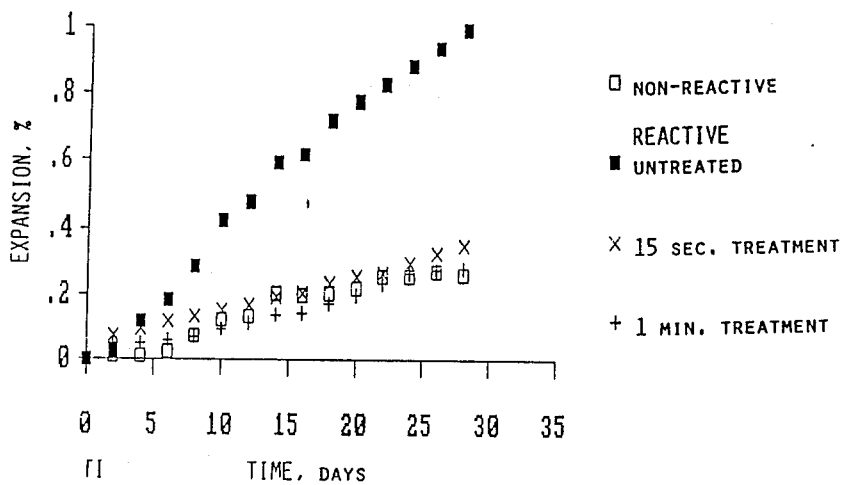
FIG 1. KINGSTON CARBONATE (TREATED CONCRETE)
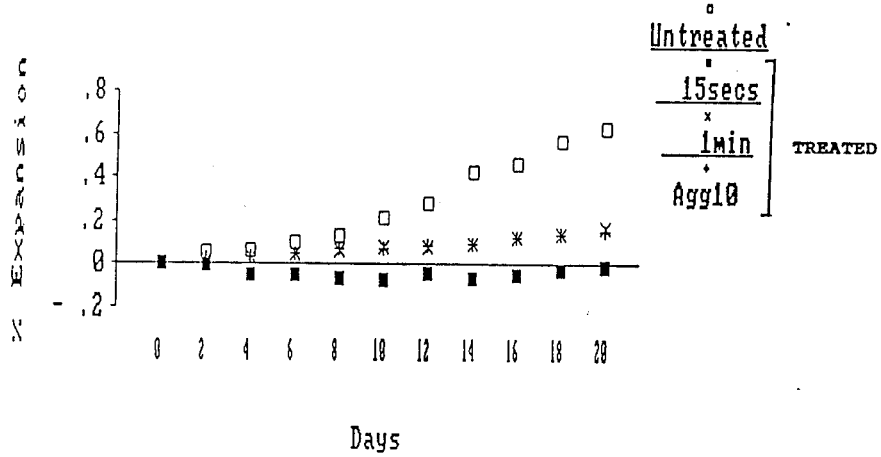
FIG. 2. Putnam CHERT (TREATED AGGREGATE)

BENEFACTION OF CONCRETE AND AGGREGATE USING CALCIUM PHOSPHATE

BACKGROUND OF INVENTION (a) Field of the Invention

This invention relates to the field of phosphate additives and to methods of use of such additives. More particularly, the present invention is concerned with the utilization of certain inorganic phosphates, such as various calcium phosphates for the benefaction of an aggregate to improve its resistance to natural and de-icing salt induced breakdown and to improve the resistance to that breakdown of concrete and bituminous mix produced therewith. According to the invention, the inorganic phosphates are also useful for preventing spalling and breakdown of concrete surfaces due to road salt and freezing and thawing, as well as of corrosion of reinforcing steel in concrete due to road salt. The invention is also concerned with the addition of the above phosphates to road salt to reduce or prevent corrosion to cars or other vehicles. Finally, the invention is also directed to wet concrete mixtures incorporating such phosphate additives.

(b) Description of Prior Art

Some rock types, such as shales, shaley carbonates, cherts, slates, etc. are considered as deleterious when present in crushed stone, especially if these materials are intended to be used for producing concrete. If a pit or quarry contains significant percentages of these materials, for example more than 5 weight percent which is usually the case, it is considered generally unsuitable for preparing concrete. To obviate this difficulty, mechanical method of removal based on differences in gravity are now employed to separate the undesirable particles. The capital and operating costs are prohibitive to any but the largest producers.

General Electric has proposed a method of beneficiating the concrete aggregate by coating the particles with a thin polymer membrane that allows entry and egress of water into the particle but not of dissolved road salt. This treatment, like the mechanical removal mentioned above is likely to be too costly to be practical.

On the other hand it is well known that concrete is adversely affected as a result of repeated freezing and thawing and treatment with road salts. To this date, Applicant is not aware of successful treatments for the surface of concrete. Furthermore, in reinforced concrete which makes use of re-enforcing bars, the latter are rapidly subjected to corrosion mainly as a result of the penetration of de-icing salt into the substance of the concrete.

Some high alkali cements when used in concrete mix react with certain silicate and carbonate aggregates. The reaction continues over several decades, and expands and cracks the concrete. Addition of ground slag, silica fumes, and fly ash can reduce the reaction with silicate aggregates; however, no method has been found to reduce the reaction with carbonate aggregates. The proclivity of the concrete to alkali-aggregate reaction is measured by linear expansion of specimens when exposed to highly alkaline environment.

Monocalcium phosphate monohydrate was found to completely stop the reaction with both the silicate and carbonate reactive aggregates. There exist two ways to achieve this: treating the concrete after it has hardened, or treating the aggregate prior to incorporation into concrete.

Finally, there is an urgent need to treat de-icing salt in order to at least substantially reduce the enormous damages to cars and other vehicles due to corrosion.

U.S. Pat. No. 3,973,056 teaches that calcium phosphate may be used to prevent stress corrosion cracking of steel pipelines. U.S. Pat. No. 3,887,488 relies on the utilization of calcium phosphate to inhibit corrosion in sulphuric acid solutions. On the other hand, phosphates are generally known as anti-corrosive agents according to U.S. Pat. Nos. 4,000,076 and 4,168,983. U.S. Pat. No. 2,048,932 discloses a cement coating which contains sodium phosphate, and which can be used to prevent disintegration of concrete. U.S. Pat. No. 1,296,467 discloses that certain phosphates such as calcium ammonium phosphate are useful to prevent concrete from disintegrating. U.S. Pat. No. 3,087,825 mentions that compounds of phosphoric acid which form an insoluble compound with calcium hydroxide are useful to increase the corrosion resistance in cement. Finally, U.S. Pat. No. 4,054,460 discloses a cement composition which contains tricalcium phosphate. However, nothing in the prior art reveals a phosphate treatment for a concrete aggregate or method of inhibiting the corrosion effect of salt on concrete.

SUMMARY OF INVENTION

It is therefore an object of the present invention to treat an aggregate used in concrete or a so-called blacktop mix with a solution of an inorganic phosphate so as to significantly improve the resistance of concrete to breakdown due to natural weathering, to freezing and thawing, and to road salts.

It is another object of the present invention to provide a method which enables to completely stop the reaction of high alkali cements with both the silicate and carbonate reactive aggregates, by treating the concrete after it has hardened, or treating the aggregate prior to incorporation into concrete.

It is another object of the present invention to treat a concrete aggregate or concrete itself with an inorganic phosphate to make them resistant to road salts.

It is another object of the present invention to produce concrete by using lower quality aggregate while significantly reducing the aggregate failure.

It is another object of the present invention to treat hardened concrete surfaces with an inorganic phosphate so as to protect the concrete from freezing and thawing and from road salts.

According to the invention there is provided a method for the benefaction of an aggregate to improve its resistance to natural and de-icing salt induced breakdown, and to improve the resistance to that breakdown of concrete and bituminous mix produced therewith. The method comprises treating the aggregate with a solution of calcium phosphate previously to incorporating the aggregate in concrete or bituminous mix. Preferably, a greater then 20 weight percent of the calcium phosphate is added to the water bath and the aggregate is immersed for less than one minute. Alternatively, between about 0.1 and 6 weight percent of the calcium phosphate is added to the water bath in which the aggregate is immersed for more than one hour. The preferred calcium phosphate consists of monocalcium phosphate monohydrate.

According to another embodiment of the invention, there is also provided a method of preventing spalling and breakdown of concrete surfaces due to road salt and freezing and thaing, and of corrosion of reinforcing steel in concrete due to road salt. The method comprises mixing or treating the road salt with calcium phosphate. Preferred amounts of calcium phosphate vary between about 0.1 and 6 percent of the road salt, and the preferred calcium phosphate consists of monocalcium phosphate monohydrate.

According to another embodiment of the invention, there is provided a method of reducing or preventing corrosion to cars and other vehicles travelling on surfaces treated with de-icing salts which comprises mixing or treating the road salt with calcium phosphate. The preferred amounts of calcium phosphate vary between 0.1 and 6 percent of the road salt and the preferred calcium phosphate consists of monocalcium phosphate monohydrate.

According to another embodiment of the invention, there is provided a method of preventing spalling and breakdown of concrete surfaces due to road salt and freezing and thawing, and of corrosion of reinforcing steel in concrete due to road salt, which comprises spraying the surfaces of the concrete with an aqueous solution containing a calcium phosphate. The preferred amounts of calcium phosphate in the solution vary between 1 and 55 weight percent, and the preferred calcium phosphate consists of monocalcium phosphate monohydrate.

According to another embodiment of the invention, there is provided a method of protecting porous inorganic building material such as brick from damages resulting from freezing and thawing, and/or damage by road salts, which comprises spraying the surfaces of the porous material with an aqueous solution comprising a calcium phosphate. The preferred amounts of calcium phosphate in the phosphate solution vary between 1 and 55 weight percent, and the preferred calcium phosphate consists of monocalcium phosphate monohydrate.

According to another embodiment of the invention, there is provided a wet concrete mixture adapted to prevent corrosion effect in reinforced concrete produced therewith, and to increase its strength. The mixture comprises water, cement, aggregates and a phosphate additive, such as calcium fluoro phosphate, monocalcium phosphate monohydrate and mixtures thereof.

As a result of tests which were made by using the teaching of the present invention, it has been found that when an aggregate used in concrete or 'blacktop' mix is treated with a relatively dilute solution of a phosphate, its resistance to breakdown due to natural weathering, to freezing and thawing, and to road salts is significantly improved, making it particularly resistant to road salt.

Thus it is possible to use lower quality aggregate and significantly reduce the aggregate failure. Aggregate resources not utilized now because of their low quality could become commercial.

The phosphate treatment according to the invention could be applied during normal processing of the aggregate at the pit or quarry with minimal extra operational costs.

It is believed that the phosphate, upon entering the rock pores, is partially precipitated, rendering long-term protection. However, some remains in soluble form, and may be leached out in time. Laboratory leaching studies show that repeated leaching does reduce protection to varying degrees, but significant degree of protection still remains.

BRIEF DESCRIPTION OF DRAWINGS

FIG. 1 shows an example of expansion of concrete made with non-reactive carbonate aggregate, and concrete made with reactive carbonate aggregate; and FIG. 2 shows an example of expansion of untreated and treated siliceous aggregate.

A treatment according to the invention may consist of immersion of the specimens (concrete or aggregate) in a 1% solution of the phosphate for 15 seconds, drying, and repeating the treatment 5 times; OR immersing the specimen in a 10% solution of phosphate for 1 minute; OR any combination of the above treatment methods. After treatment, the sample is placed in 1N NaOH solution to simulate alkaline environment, and length changes monitored on daily basis. The results, presented in graphical form below, indicate that the untreated samples continue to expand, while treated samples have minimal expansion, comparable to unreactive aggregate, and, in some cases, contraction.

With reference to FIG. 1, it will be seen that one set of samples with reactive aggregate were left untreated, the other sets treated with 5-cycle immersion for 15 seconds and 1 minute respectively. The treated samples show similar expansion to non-reactive aggregate.

With reference to FIG. 2, the aggregates were treated with 5-cycle immersion in 1% phosphate for 15 seconds and 1 minute respectively, and single immersion in 10% phosphate for 10 minutes. After treatment, the aggregates were cast in concrete, cured, and exposed to 1N NaOH solution. Compared to untreated aggregate, the treated aggregates clearly show that the alkali reactivity has been arrested.

Some typical freeze-thaw results obtained on a variety of aggregates tested using monocalcium phosphate monohydrate are given below. All freeze-thaw tests were done using 3% NaCl solution, a concentration proven to be most destructive.

DESCRIPTION OF PREFERRED EMBODIMENTS

EXAMPLE 1

Effect of concentration of phosphate salt:
(average of five different aggregate types)

| Concentration of phosphate salt | 0% | .1% | .5% | 1% | 5% |
|---|---|---|---|---|---|
| Freeze-Thaw Loss, % | 24.2 | 19.7 | 16.9 | 14.9 | 12.8 |

EXAMPLE 2

Effect of length of treatment with 3% phosphate salt:
(average of five different aggregate types)

| Length of treatment, min | 0 | 10 | 100 | 600 | 1000 |
|---|---|---|---|---|---|
| Freeze-Thaw Loss, % | 25.1 | 17.6 | 15.6 | 14.0 | 13.5 |

It is believed that a phosphate salt in water reduces its surface tension, allowing deep penetration. Thus, existing concrete surface can be sprayed with a phosphate solution, and the phosphate will penetrate to sufficient depth to protect the porous material from freezing and thawing and from road salts. Laboratory experiments with concrete show significant improvement in freeze-thaw tests between treated and untreated concrete slabs. Some concrete frozen and thawed after treatment with phosphate is virtually unaffected.

EXAMPLE 3

In laboratory tests, slabs of concrete were cut and subjected to freeze-thaw spalling tests. The concrete was first surface treated in various treatment solutions as shown below, and then frozen and thawed in 3% NaCl solution for 10 24 h cycles. Typical experimental results are given below:

| Surface Treatment | Freeze-Thaw Loss, % |
| --- | --- |
| Water | 55.2 |
| 3% NaCl | 85.9 |
| 3% SP | 47.1 |
| 3% STP | 20.0 |

SP stands for mineral calcium phosphate (apatite) and STP stands for monocalcium phosphate monohydrate.

EXAMPLE 4

Tests were also done on mortar cubes 4×4×3 cm in size. The cubes were prepared in batches of over 1200 to ensure constancy. Most were prepared with standard sand and tested under variety of treatments. Some were prepared with specific aggregate type, and some with steel filings to measure corrosion.

The effect of concentration of STP salt on freeze-thaw loss is given in the table below. Each concentration represents an average of four tests of 12 cubes each.

| STP Concentration percent | Freeze-Thaw Loss percent |
| --- | --- |
| 0 | 50.0 |
| 0.3 | 48.6 |
| 0.6 | 46.3 |
| 1.0 | 43.1 |
| 3.0 | 37.5 |
| 10.0 | 18.5 |

The effect of length of treatment was also determined on the cubes. A 3% concentration of STP was used, and freezing and thawing was done in 3% NaCl solution. The average of four tests of 12 cubes each is given below:

| Length of Treatment | Freeze Thaw Loss, % |
| --- | --- |
| No treatment | 43.3 |
| 1 day | 35.4 |
| 2 days | 26.7 |
| 3 days | 24.5 |
| 4 days | 21.8 |
| 5 days | 21.9 |

STP phosphate salt was found most effective, and capable, in relatively small concentrations, of reducing the freeze-thaw loss by more than 50% under proper conditions of application.

When the concentration of the phosphate solution is increased, the length of time required for immersion is significantly decreased. Mortar cubes were immersed in a 20% by weight solution of monosodium phosphate monohydrate for the time intervals shown, and then the cubes were freeze-thawed in 3% sodium chloride solution for 5 24-h cycles.

| Length of treatment | Freeze-Thaw Loss, % |
| --- | --- |
| No treatment | 46.5 |
| 10 sec | 28.0 |
| 1 min | 18.6 |
| 5 min | 12.4 |
| 15 min | 5.0 |
| 1 hr | 4.5 |

The results show that immersion or spray treatment of materials by the relatively concentrated phosphate solution for even short period of time is effective in reducing the freeze-thaw loss.

Natural field exposures of concrete barrier wall along a highway were sprayed with the solution. After one winter, the treated wall had visibly lesser deterioration compared to neighbouring untreated panels. The panels were treated the following fall, and not treated during the third winter. At present, the treated panels show a significant improvement in spalling resistance over the untreated ones.

EXAMPLE 5

Mortar cubes whose initial durability loss during 5-cycle freezing and thawing averaged 46.5 percent were immersed in a 20% solution of monocalcium phosphate monohydrate for 10 seconds, and dried at room temperature for 24 h. The 10 second soaking and 24 h drying was repeated for a total of 5 cycles. After the last cycle, the specimens were subjected to freezing and thawing in 3% salt solution for 5 cycles. The average durability loss after the test was 3.0% (as compared to 46.5% reported above).

Even relatively short time exposure, just as might be experienced by spraying the chemical on the concrete resulted in a dramatic increase in the durability of the specimens.

It has also been found that the addition of phosphate to road salt (sodium chloride or calcium chloride) in appropriate ratio renders the corrosive effects of the salt harmless both to the concrete and to the steel. Steel samples immersed in the solution of the mixture remained unaffected, whereas similar steel in water and in solution of salt alone corroded badly over a period of 16 months. Aggregate, mortar, and concrete samples frozen and thawed in the mixture of salt and phosphate showed a deterioration no greater than if frozen and thawed in pure water. In other words, although the mixture delivers the de-icing benefits, it does so without attendant harm to the material.

EXAMPLE 6

A mild steel similar to concrete reinforcing rods was encased in gypsum and then the encased system was itself encased in concrete. After appropriate curing, the specimens were placed in solutions of 3% sodium chloride and various concentrations (1) to 20%) of monocalcium phosphate monohydrate. Voltage and amperage developed by the system were monitored. After two months' exposure, the samples were split open to visually gauge the corrosion of the steel.

The purpose of the gypsum was to provide a near neutral to slightly acidic environment which promotes corrosion (as opposed to highly corrosion resistant alkaline environment of steel encased directly in concrete). Both salt and phosphate in solution had equal opportunity to permeate through the concrete and the gypsum and attack the steel. It was found by electrical measurements that phosphate preferentially reacted with the steel compared to salt. It was also found upon breaking the specimens open that the calcium phosphate protected the steel from corrosion in the presence of the salt; the higher the concentration of calcium phosphate the better the protection.

The slow reaction of calcium phosphate with concrete produces a precipitate which by itself is an anticorrosive agent. Steel coated with the precipitate successfully resisted corrosion in 3% NaCl solution.

Various compounds of sodium, potassium and calcium phosphate were studied as part of this invention. It was discovered that monocalcium phosphate monohydrate offered the best combination of protection against freeze-thaw deterioration, de-icing salt scaling, and corrosion damage.

The most useful and immediately saleable variant of this application is the private or institutional use of the road salt mixture. The use of the mixture by the homeowner or a business would not adversely affect the environment, and would reduce the scaling and spalling of concrete sidewalks that is now so prevalent.

The phosphate SP, calcium fluoro phosphate was tested as an admixture to wet concrete. SP has limited solubility, and does not react with the mix during setting and curing period. The test consisted of concrete mortar cube specimens with embedded steel shavings and SP cement varying from 0 to 10% by weight. After curing, the cubes were placed in salt solution for 2 years, and their volume change and strength monitored. After the first 6 months, the TP containing cubes showed statistically higher strength compared to those not containing the additive.

EXAMPLE 7

The strength and expansion results on mortar cubes prepared with the same mixture of water-cement-aggregate, but different amount of SP phosphate replacing the fine aggregate in the mix are given below. The visual estimate of the proportion of the rust remaining on the pre-rusted steel filings is also given.

| Mixture | Comp. Strength, mPA | Expansion, % | Rusted Steel, % |
|---------|---------------------|--------------|-----------------|
| No SP   | 30.0                | .20          | 12.0            |
| .5% SP  | 31.3                | .17          | 8.0             |
| 1% SP   | 32.1                | .14          | 6.5             |
| 3% SP   | 32.3                | .05          | 9.8             |
| 5% SP   | 33.3                | .00          | 6.5             |
| 10% SP  | 29.0                | .20          | 4.7             |

The results show that the 5% content (by sand weight) of the SP in the mix increased the compressive strength, decreased the expansion (due to rusting), and decreased the amount of rust on the steel filings in significant amounts.

I claim:

1. A method for benefaction of rock or stone aggregate to improve its resistance to natural and de-icing salt induced breakdown and to reaction with high alkali environments, and to improve the resistance to breakdown of concrete and bituminous mix produced therewith, said method comprising treating the aggregate with a dilute solution of calcium phosphate previously to incorporating the aggregate in concrete or bituminous mix.

2. Method according to claim 1, wherein said solution comprises between about 0.1 and 6 weight percent of said calcium phosphate.

3. Method according to claim 2, wherein said calcium phosphate consists of monocalcium phosphate monohydrate.

4. A method of preventing spalling and breakdown of concrete surfaces due to road salt and freezing and thawing, said method comprising mixing or treating the road salt with calcium phosphate prior to applying the salt to an area to be de-iced.

5. Method according to claim 4, wherein the amounts of calcium phosphate comprises between 0.1 and 6 percent of said road salt.

6. Method according to claim 5, wherein said calcium phosphate consists of monocalcium phosphate monohydrate.

7. A method of preventing spalling and breakdown of porous concrete surfaces due to action of road salt in the pores of said concrete and freezing and thawing, said method comprising spraying the concrete surfaces with an aqueous solution containing solubilized monocalcium phosphate monohydrate, which is at least partially preciopitated in said pores.

8. Method according to claim 7, wherein said monocalcium phosphate monohydrate solution comprises between 1 and 55 percent of said calcium phosphate.

9. A method of protecting a porous material from damage resulting from de-icing salt in the pores of said material and freezing and thawing said method comprising spraying the surfaces of said porous material with an aqueous solution comprising solubilized monocalciium phosphate monohydrate, which is at least partially precipitated in said pores.

10. Method according to claim 1, wherein said calcium phosphate solution comprises between 1 and 55 percent of said monocalcium phospate monohydrate.

11. A wet concrete mixture adapted to prevent physical deterioration due to de-icing salt in pores and alkali reactivity of concrete produced with said wet mixture, and to increase its strength, said wet concrete comprising cement, aggregates, and water containing a solubilized calcium phosphate additive.

12. A wet concrete mixture according to claim 11, wherein said phosphate additive comprises a mixture of calcium fluoro phosphate or mineral apatite, and monocalcium phosphate monohydrate.

* * * * *